US00RE36403E

United States Patent [19]

Krishna

[11] E Patent Number: Re. 36,403

[45] Reissued Date of Patent: Nov. 23, 1999

[54] GASOLINE OCTANE ENHANCEMENT IN FLUID CATALYTIC CRACKING PROCESS WITH SPLIT FEED INJECTION TO RISER REACTOR

[75] Inventor: Ashok S. Krishna, Concord, Calif.

[73] Assignee: Chevron Research and Technology Company, San Francisco, Calif.

[21] Appl. No.: 08/357,567

[22] Filed: Dec. 16, 1994

Related U.S. Patent Documents

Reissue of:

[64] Patent No.: 4,869,807
Issued: Sep. 26, 1989
Appl. No.: 07/067,678
Filed: Jun. 26, 1987

U.S. Applications:

[

[63] Continuation of application No. 07/764,599, Sep. 24, 1991, abandoned, which is a continuation-in-part of application No. 06/792,718, Oct. 30, 1985, abandoned.

[51] Int. Cl.[6] ..... C10G 11/05

[52] U.S. Cl. ..... 208/120.01; 208/113; 208/80

[58] Field of Search ..... 208/73, 74, 80, 208/113, 120, 155, 156, 120.01

[56] References Cited

U.S. PATENT DOCUMENTS

| | | | |
|---|---|---|---|
| 2,444,131 | 6/1948 | Seguy | 196/52 |
| 2,908,630 | 10/1959 | Friedman | 208/74 |
| 2,938,856 | 5/1960 | Hettick | 208/74 |
| 2,994,659 | 8/1961 | Slyngstad et al. | 208/113 |
| 3,080,311 | 3/1963 | Mertes | 208/78 |
| 3,331,766 | 7/1967 | Young | 208/78 |
| 3,617,497 | 11/1971 | Bryson et al. | 208/80 |
| 3,654,137 | 4/1972 | Dober et al. | 208/87 |
| 3,714,024 | 1/1973 | Youngblood et al. | 208/78 |
| 3,856,659 | 12/1974 | Owen | 208/80 |
| 4,405,445 | 9/1983 | Kovach et al. | 208/120 |
| 4,479,870 | 10/1984 | Hammershaimb et al. | 208/113 |

*Primary Examiner*—Walter D. Griffin
*Attorney, Agent, or Firm*—Lawrence S. Squires

[57] ABSTRACT

A fluid catalytic cracking unit equipped with multiple feed injection points along the length of the riser is operated such that portions of the same fresh feed are charged to different feed injection points. Preferably, the hydrocarbon fresh feed can be split into two or more non-distinct fractions, with one fraction charged to the bottom injection point along the length of the riser reactor, and the remaining fractions charged to injection points progressively higher up along the length of the riser reactor. Unconverted slurry oil boiling above 650° F. can be recycled to one or more of the various injection points along the length of the riser.

27 Claims, 1 Drawing Sheet

GASOLINE OCTANE ENHANCEMENT IN FLUID CATALYTIC CRACKING PROCESS WITH SPLIT FEED INJECTION TO RISER REACTOR

Matter enclosed in heavy brackets [ ] appears in the original patent but forms no part of this reissue specification; matter printed in italics indicates the additions made by reissue.

CROSS REFERENCE TO RELATED APPLICATION

[This application] *This is a continuation of application Ser. No. 07/764,599, filed Sep. 24, 1991, now abandoned, which* is a continuation-in-part of U.S. Ser. No. 792,718, filed Oct. 30, 1985, now abandoned.

FIELD OF INVENTION

The invention relates generally to catalytic cracking of hydrocarbons. In one aspect the invention relates to a change in the method of introduction of the feed, thereby creating an advantageous increase in the octane number of the gasoline produced in the process. Particularly, the invention relates to splitting the hydrocarbon feed and charging a portion of the total feed near the bottom of an elongated riser reactor, and the remaining portions progressively further up the riser.

BACKGROUND OF THE INVENTION

Feedstocks containing higher molecular weight hydrocarbons are cracked by contacting the feedstocks under elevated temperatures with a cracking catalyst whereby light and middle distillates are produced. Typically, the octane number of the light distillate (gasoline) is dependent upon the riser temperature, conversion level of operation or the catalyst type. Therefore, to increase the octane number of the gasoline, conversion of the hydrocarbon feed to lighter products must be increased by preferably raising the temperature of operation, or by increasing other operating variables such as catalyst to oil ratio. Unfortunately, a limit on the maximum operating temperature is set by reactor metallurgy, gas compressor constraint or other operating constraints. Increasing conversion by other means may also result in poor selectivity to desired products. The octane number of the gasoline may be increased by switching from a catalyst containing rare earth-exchanged Y zeolite to one containing ultrastable Y zeolite or ZSM-5, as is well known in prior art; however, such a switch will generally involve substantially higher costs, be time consuming, and above all, lead to significant reductions in the yield of gasoline.

Therefore, with the current national emphasis on lead-free gasoline, and the need for increasing gasoline octane number by means other than the addition of lead, it is desirable to have a modified cracking process available for increasing the octane number of the gasoline while minimizing the disadvantages associated with practices described in the prior art.

It is thus one object of the this invention to provide a regenerated cracking process, and a further object of this invention to provide a process for increasing the octane number of the gasoline from the process. Another object of this invention is to achieve the increase in octane number of the gasoline by modifying the method of introduction of feed to the riser reactor in a fluid catalytic cracking process.

SUMMARY OF THE INVENTION

In accordance with this invention, I have found that a desirable way to advantageously increase the octane number of the gasoline produced in the process is to charge some of the fresh hydrocarbon feed to upper injection points along the length of the riser while charging a majority of the fresh feed to the bottom of the riser.

U.S. Pat. No. 3,617,497 teaches segregation of hydrocarbon feeds to a fluid catalytic cracking process into low and high boiling fractions, and charging of the different fractions at different locations along the length of the riser reactor in order to improve the yield of gasoline from the process. An important aspect of the present invention is that segregation of hydrocarbon feed according to molecular weight, boiling range or any other criterion is not required to achieve the gasoline octane improvements associated with the process of the present invention. In accordance with the process of the present invention, a typical, full boiling range hydrocarbon feed to a fluid catalytic cracking process can be split into two or more non-distinct fractions, with one fraction charged to the bottom of the riser reactor, and the remaining fractions charged to upper injection points along the riser, to achieve the octane improvements. Thus, costly equipment associated with segregation of hydrocarbon feed into various distinct fractions is avoided, and simple piping and valving arrangements will permit practicing of the teachings of the present invention.

The distribution of feed between lower and upper injection points can cover a wide range, with between 10 and 90 volume percent of the total feed charged to bottom injector, and between 90 and 10 volume percent of total feed charged to upper injection points. In a preferred embodiment, between about 50 to 90 volume percent is injected to the lowest injection point. Typical yield shifts associated with the process of the present invention, as compared to prior art practices of charging all the feed to the bottom injector in the riser, include: equivalent or higher conversion of the hydrocarbon feed to gasoline and lighter components, equivalent or lower yield of gasoline, equivalent or higher yield of $C_3$ and $C_4$ olefins, and equivalent yields of coke and gas make. Although the yield of gasoline from the process can be lower, the octane number of the gasoline will be higher, and the yield of total gasoline (gasoline plus potential alkylate from alkylation of the $C_3$ and $C_4$ olefins from the process) will be higher.

Although gasoline octane benefits accrue even when a majority of the feed is charged to upper injection points, and a minority to the bottom injector in accordance with the present invention, maximum improvements in gasoline octane and yields of desirable liquid products are achieved when a majority of the feed is charged to the bottom injector. Thus a preferred embodiment of the present invention is a modified fluid catalytic cracking process wherein the hydrocarbon feed is split into several non-distinct or unsegregated fractions, and a major portion of the feed is charged to the lowest injection point in a riser reactor, and the remaining fractions progressively higher up along the length of the riser reactor. In a further preferred embodiment, the distance between the lowest injection position and the next highest injection position comprises at least 20% of the total length of the riser reactor. The advantages associated with practicing the teachings of the present invention will become clearer upon reading the examples which are to follow.

DETAILED DESCRIPTION OF THE INVENTION

Figure 1:
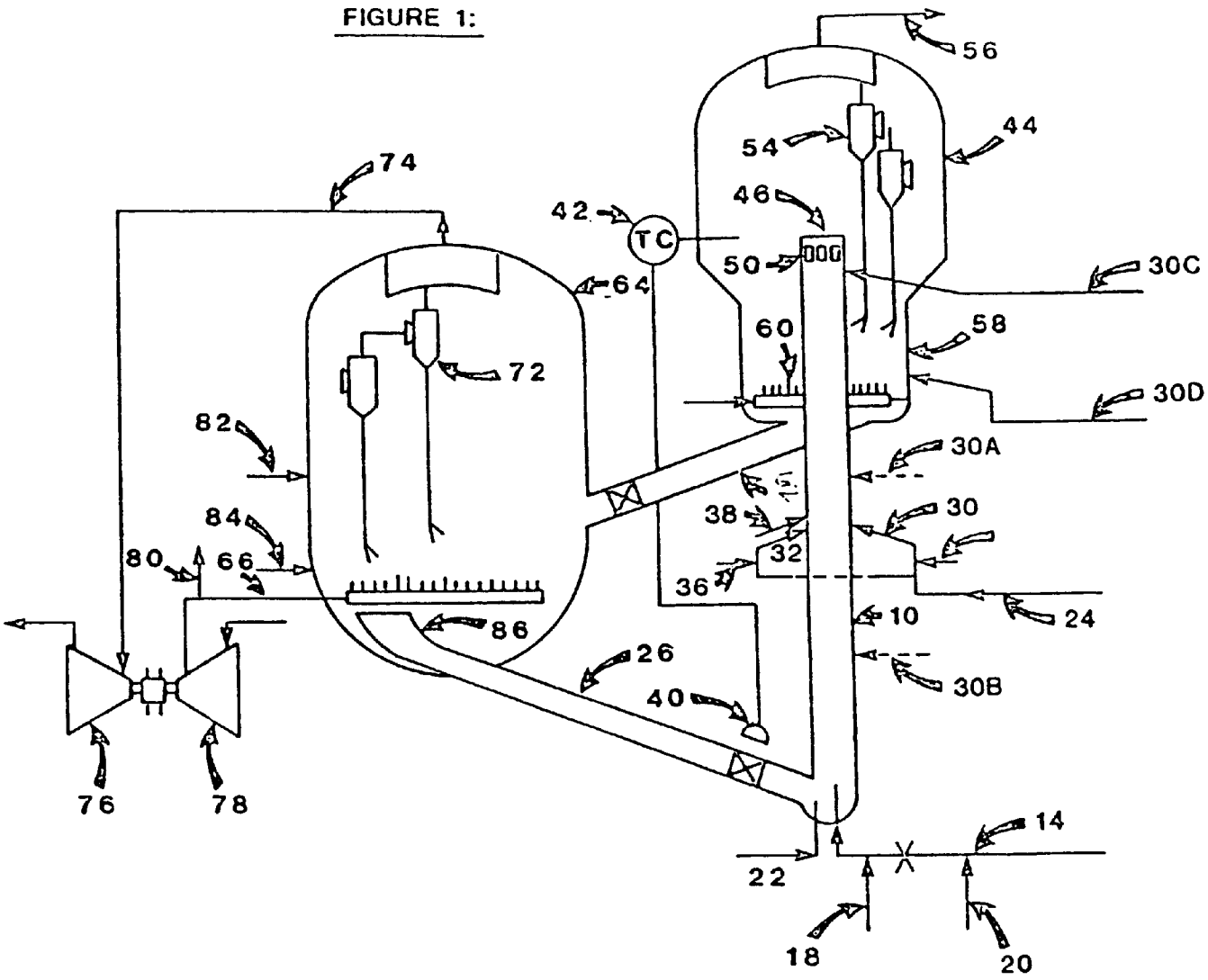
FIG. 1 shows a schematic rendition of an apparatus used to practice the process of the present invention.

A suitable reactor-regenerator system for performing this invention is described in reference to FIG. 1. The cracking occurs with a fluidized zeolitic catalyst in an elongated reactor tube 10, which is referred to as a riser. The riser has a length to diameter ratio of above 20, or preferably above 25. Hydrocarbon oil feed to be cracked can be charged directly into the bottom of the riser through inlet line 14 or it can be charged to upper injection points in the riser through lines 30A, 30B, or 30C or directly into the reactor vessel through line 30D. Steam is introduced into the lower feed injection point through line 18. Steam is also introduced independently to the bottom of the riser through line 22 to help carry upwardly into the riser regenerated catalyst which flows to the bottom of the riser through transfer line 26.

Feed to the upper injection points is introduced at about a 45 degree upward angle into the riser through lines 30 and 32. Steam can be introduced into the upper feed injection inlet lines through lines 34 and 36. Upper hydrocarbon feed injection lines 30 and 32 each represent a plurality of similar lines spaced circumferentially at the same height of the riser. Any recycle hydrocarbon can be admitted to the lower section of the riser through one of the inlet lines designated as 20, or to the upper section of the riser through one of the lines designated as 38. The residence time of hydrocarbon feed in the riser can be varied by varying the amounts or positions of introduction of the feed.

The full range oil charge to be cracked in the riser is a gas oil having a boiling range of about 430° F. to 1100° F. The feedstock to be cracked can also include appreciable amounts of virgin or hydrotreated residua having a boiling range of 900° F. to 1500° F. The steam added to the riser amounts to about 2 wt % based on the oil charge, but the amount of steam can vary widely. The catalyst employed may be fluidized zeolitic aluminosilicate and is preferably added to the bottom only of the riser. The type of zeolite in the catalyst can be a rare earth-exchanged X or Y, hydrogen Y, ultrastable Y, superstable Y or ZSM-5 or any other zeolite typically employed in the cracking of hydrocarbons. The riser temperature range is preferably about 900° F. to 1100° F. and is controlled by measuring the temperature of the product from the risers and then adjusting the opening of valve 40 by means of temperature controller 42 which regulates the inflow of hot regenerated catalyst to the bottom of the riser. The temperature of the regenerator catalyst should be above the control temperature in the riser so that the incoming catalyst contributes heat to the cracking reaction. The riser pressure should be between about 10 and 35 psig. Between about 0 and 10% of the oil charge to the riser is recycled with the fresh oil feed to the bottom of the riser.

The residence time of both hydrocarbon and catalyst in the riser is very small and preferably ranges from 0.5 to 5 seconds. The velocity throughout the riser is about 35 to 65 feed per second and is sufficiently high so that there is little or no slippage between the hydrocarbon and catalyst flowing through the riser. Therefore, no bed of catalyst is permitted to build up within the riser, whereby the density within the riser is very low. The density within the riser ranges from a maximum of about 4 pounds per cubic foot at the bottom of the riser and decreases to about 2 pounds per cubic foot at the top of the riser. Since no dense bed of catalyst is ordinarily permitted to build up within the riser, the space velocity through the riser is usually high and ranges between 100 or 120 and 600 weight of hydrocarbon per hour per instantaneous weight of catalyst in the reactor. No significant catalyst buildup within the reactor should be permitted to occur and the instantaneous catalyst inventory within the riser is due to a flowing catalyst to oil weight ratio between about 4:1 and 15:1, the weight ratio corresponding to the feed ratio.

The hydrocarbon and catalyst exiting from the top of each riser is passed into a disengaging vessel 44. The top of the riser is capped at 46 so that discharge occurs through lateral slots 50 for proper dispersion. An instantaneous separation between hydrocarbon and catalyst occurs in the disengaging vessel. The hydrocarbon which separates from the catalyst is primarily gasoline together with middle distillate and heavier components and some lighter gaseous components. The hydrocarbon effluent passes through cyclone system 54 to separate catalyst fines contained therein and is discharged to a fractionator through line 56. The catalyst separated from hydrocarbon in disengager 44 immediately drops below the outlets of the riser to that there is no catalyst level in the disengager but only in a lower stripper section 58. Steam is introduced into catalyst stripper section 58 through sparger 60 to remove any entrained hydrocarbon in the catalyst.

Catalyst leaving stripper 58 passes through transfer line 62 to a regenerator 64. This catalyst contains carbon deposits which tend to lower its cracking activity and as much carbon as possible must be burned from the surface of the catalyst. The burning is accomplished by introduction to the regenerator through line 66 of approximately the stoichiometrically required amount of air for combustion of the carbon deposits. The catalyst from the stripper enters the bottom section of the regenerator in a radial and downward direction through transfer line 62. Flue gas leaving the dense catalyst bed in regenerator 64 flows through cyclones 72 wherein catalyst fines are separated from flue gas permitting the flue gas to leave the regenerator through line 74 and pass through a turbine 76 before leaving for a waste heat boiler, wherein any carbon monoxide contained in the flue gas is burned to carbon dioxide to accomplish heat recovery. Turbine 76 compresses atmospheric air in air compressor 78 and this air is charged to the bottom of the regenerator through line 66.

The temperature throughout the dense catalyst bed in the regenerator is about 1250° F. The temperature of the flue gas leaving the top of the catalyst bed in the regenerator can rise to afterburning of carbon monoxide to carbon dioxide. Approximately a stoichiometric amount of oxygen is charged to the regenerator in order to minimize afterburning of carbon monoxide to carbon dioxide above the catalyst bed, thereby avoiding injury to the equipment, since at the temperature of the regenerator flue gas some afterburning does occur. In order to prevent excessively high temperatures in the regenerator flue gas due to afterburning, the temperature of the regenerator flue gas is controlled by measuring the temperature of the flue gas entering the cyclones and then venting some of the pressurized air otherwise destined to be charged to the bottom of the regenerator through vent line 80 in response to this measurement. Alternatively, CO oxidation promoters can be employed, as is now well known in the art, to oxidize the CO completely to $CO_2$ in the regenerator dense bed thereby eliminating any problems due to afterburning in the dilute phase. With complete CO combustion, regenerator temperatures can be in excess of 1250° F. up to 1500° F. The regenerator reduces the carbon content of the catalyst from about 1.0 wt % to 0.2 wt %, or less for the maximum gasoline mode of operation. If required, steam is available through line 82 for cooling the regenerator. Makeup catalyst may be added to the bottom of the regenerator through line 84. Hopper 86 is disposed at the bottom of the regenerator for receiving regenerated catalyst to be passed to the bottom of the reactor riser through transfer line 26.

TABLE I

| FEEDSTOCK INSPECTIONS | | |
|---|---|---|
| Description | Feed 1 | Feed 2 |
| API Gravity | 22.8 | 26.7 |
| Sulfur: Wt % | 1.89 | 0.71 |
| Nitrogen: Wt % | 0.085 | 0.12 |
| Hydrogen: Wt % | 11.98 | — |
| Carbon Residue: Wt % | 0.39 | 1.74 |
| Aniline Point: ° F. | 172.4 | 198.4 |
| Viscosity @ 210° F. | 45.2 | — |
| Pour Point: ° F. | +95 | — |
| Nickel: ppm | 0.3 | 4.9 |
| Vanadium: ppm | 0.5 | 1.0 |
| Distillation: D1160 | | |
| 10% | 666 | 573 |
| 30% | 740 | 717 |
| 50% | 791 | 811 |
| 70% | 856 | 928 |
| 90% | 943 | 1101 |
| EP | | |
| Hydrocarbon Types: Mass Spec. | | |
| Aromatics | 49.3 | — |
| Mono | 21.6 | — |
| Di | 14.8 | — |
| Tri+ | 7.0 | — |
| Saturates | 49.5 | — |
| Alkanes | 18.5 | — |
| Cycloalkanes | 31.0 | — |
| Polar Compounds | 1.2 | — |
| Insolubles | — | — |
| Volatiles | — | — |

EXAMPLES

To demonstrate the efficacy of my invention, a number of tests were conducted on a circulating pilot plant of the fluid catalytic cracking process using feedstocks described in Table I.

EXAMPLE I

Table II presents pilot plant data on cracking of a gas oil feed using a conventional rare earth-exchanged Y zeolitic cracking catalyst in the pilot plant. Run No. 1 involved charging of all the fresh hydrocarbon feed to the bottom injector in the pilot plant. In Run No. 2, 75 volume percent of the fresh feed was charged to the bottom injector and the remaining 25 volume percent was charged to an injection point higher up in the riser reactor. Comparing the results from Run No. 1 and Run No. 2, it is evident that the yield of total gasoline plus alkylate, and the octane numbers (both research and motor octane numbers) of the gasoline are significantly higher with Run No. 2 which practiced the teachings of the present invention. In Run No. 3, only 25 volume percent of the fresh feed was charged to the bottom injector, with the remaining 75 volume percent was charged to the upper injection point. Comparing the results of Run Nos. 1, 2 and 3, it is obvious that while research octane number benefits are associated with both Run Nos. 2 and 3 compared to Run No. 1, the total yield of gasoline, and the motor octane number of the gasoline are highest for Run No. 2. Thus, while research octane numbers increase by apparently the same extent for both Run Nos. 2 and 3 compared to Run No. 1, best results are achieved when a majority of the feed is charged to the bottom injector, as in the case of Run No. 2. While the research octane number increase is the same for the two case involving split feed injection shown in Table III (Run Nos. 2 and 3), it is important to note that mechanisms involved in achieving the increase are different in the two cases. As shown in Table II, the increase in research octane number for Run No. 2, over Run No. 1, comes from an increase in the aromatic content of the gasoline; this explains why the motor octane number is also higher for Run No. 2 over Run No. 1. However, comparing the results of Run Nos. 1 and 3, it is obvious that the higher research octane number of the gasoline for Run No. 3 is due to the increase in the olefinic content of the gasoline, not the aromatic content. For those skilled in prior art, this will also explain why the motor octane number of the gasoline from Run No. 3 is not higher than that from Run No. 1.

EXAMPLE II

Table III shows pilot plant data on a high octane-producing catalyst containing the rare earth-exchanged Y zeolite and the ZSM-5 zeolite. Run No. 4 corresponds to a conventional fluid catalytic cracking process wherein all the fresh feed is charged to the bottom of the riser reactor. In Run No. 5, 60 volume percent of the fresh feed is charged to the bottom of the riser, and the remaining 40 volume percent to an upper injection point along the length of the riser. Comparing the results from the two runs, the higher octane numbers and higher total gasoline yield advantages associated with Run No. 5, in accordance with the present invention, are obvious.

TABLE II

| Run Number | 1 | 2 | 3 |
|---|---|---|---|
| Chargestock | ← Feed 1 → | | |
| Catalyst Containing | Conventional Rare Earth ← Exchanged Y Zeolite → | | |
| Operating Conditions | | | |
| Riser Outlet Temp., ° F. | ← 980 → | | |
| Riser Inlet Temp., ° F. | ← 1200 → | | |
| Volume % Feed to Bottom Injector | 100 | 75 | 25 |
| Volume % Feed to Upper Injector | 0 | 25 | 75 |
| Conversion: Vol % FF | 81.9 | 81.6 | 78.7 |
| Product Yields: Vol % FF | | | |
| Total $C_3$ | 12.0 | 13.9 | 12.4 |
| $C_3$ = | 10.1 | 11.7 | 10.5 |
| Total $C_4$ | 19.9 | 21.8 | 19.3 |
| $iC_4$ | 6.1 | 6.6 | 5.3 |
| $C_4$ = | 12.5 | 13.7 | 12.8 |
| $C_5$ –430° F. Gasoline | 63.1 | 59.9 | 59.6 |
| 430–650° F. Light Catalytic Gas Oil | 11.5 | 11.6 | 12.7 |
| 650° F. + Decanted Oil | 6.6 | 6.8 | 8.6 |
| $C_3$ + Liquid | 113.2 | 114.0 | 112.7 |
| Total Gasoline + Alkylate | 103.1 | 104.8 | 100.7 |
| Product Yields: Wt % FF | | | |
| $C_2$ and Lighter | 2.8 | 3.0 | 2.8 |
| Coke | 5.6 | 5.6 | 5.3 |
| Gasoline | | | |
| API | 57.1 | 55.7 | 56.6 |
| Aromatics: Vol % | 27.5 | 31.1 | 26.5 |
| Olefins: Vol % | 36.9 | 30.7 | 40.2 |
| Saturates: Vol % | 35.5 | 38.3 | 33.3 |
| Motor Octane Clear | 80.7 | 81.4 | 80.2 |
| Research Octane Clear | 93.9 | 95.1 | 95.2 |

TABLE III

| Run Number | 4 | 5 |
|---|---|---|
| Chargestock | ← Feed 1 → | |
| Catalyst Containing | ← ZSM-5 Zeolite → | |
| Operating Conditions | | |
| Riser Outlet Temp., ° F. | ← 980 → | |
| Riser Inlet Temp., ° F. | ← 1200 → | |
| Volume % Feed to Bottom Injector | 100 | 60 |
| Volume % Feed to Upper Injector | 0 | 40 |
| Conversion: Vol % FF | 72.8 | 75.4 |
| Product Yields: Vol % FF | | |
| Total $C_3$ | 10.5 | 11.6 |
| $C_3$ = | 8.0 | 8.8 |
| Total $C_4$ | 15.6 | 17.5 |
| $iC_4$ | 5.8 | 6.4 |
| $C_4$ = | 8.3 | 9.3 |
| $C_5$—430° F. Gasoline | 52.6 | 51.5 |
| 430–650° F. Light Catalytic Gas Oil | 11.2 | 10.5 |
| 650° F. + Decanted Oil | 15.2 | 13.3 |
| $C_3$ + Liquid | 105.9 | 105.2 |
| Total Gasoline + Alkylate | 99.4 | 101.4 |
| Product Yields: Wt % FF | | |
| $C_2$ and Lighter | 3.4 | 3.7 |
| Coke | 6.0 | 5.9 |
| Gasoline | | |
| Motor Octane Clear | 79.5 | 80.7 |
| Research Octane Clear | 90.8 | 93.3 |

EXAMPLE III

In this example, a feedstock containing a high boiling residual component (boiling above 1000° F.) was cracked over conventional rare earth-exchanged Y zeolite containing catalyst in the fluid catalytic cracking pilot plant. Again, Run No. 6 corresponds to a conventional fluid catalytic cracking process wherein all the fresh feed is charged to the bottom of the riser reactor. In Run No. 7, 40 volume percent of the fresh feed was charged to the bottom of the riser, and the remaining 60 volume percent to an upper injection point in the riser. In Run No. 8, 60 volume percent of the fresh feed was charged to the bottom of the riser while the remaining 40 volume percent was charged to the upper injection point. It is important to note that in all of the cases described in Table IV, the various feed fractions were identical in quality, in other words, the lower and upper injection feeds were not segregated according to molecular weight or boiling range or any other criterion. Comparing the results in the three columns in Table IV, the advantages associated with the teachings of the present invention, and in particular, charging a majority of the fresh feed to the bottom injector as in the case of Run No. 8, are obvious.

TABLE IV

| Run Number | 6 | 7 | 8 |
|---|---|---|---|
| Chargestock | ← Feed 2 → | | |
| Catalyst Containing | Rare Earth ← Exchanged Y Zeolite → | | |
| Operating Conditions | | | |
| Riser Outlet Temp., ° F. | ← 980 → | | |
| Riser Inlet Temp., ° F. | ← 1250 → | | |
| Volume % Feed to Bottom Injector | 100 | 40 | 60 |
| Volume % Feed to upper Injector | 0 | 60 | 40 |
| Conversion: Vol % FF | 70.7 | 72.8 | 74.9 |
| Product Yields: Vol % FF | | | |
| Total $C_3$ | 9.0 | 11.2 | 10.4 |
| $C_3$ = | 7.6 | 9.4 | 9.1 |
| Total $C_4$ | 13.8 | 16.0 | 16.7 |
| $iC_4$ | 2.6 | 3.3 | 3.1 |
| $C_4$ = | 10.4 | 11.7 | 12.6 |
| $C_5$—430° F. Gasoline | 56.6 | 55.2 | 58.5 |
| 430–650° F. Light Catalytic Gas Oil | 18.0 | 16.8 | 15.0 |
| 650° F. + Decanted Oil | 11.3 | 10.4 | 10.2 |
| $C_3$ + Liquid | | | |
| Total Gasoline + Alkylate | 88.4 | 92.5 | 97.0 |
| Product Yields: Wt % FF | | | |
| $C_2$ and Lighter | 3.1 | 3.6 | 3.0 |
| Coke | 4.2 | 4.3 | 4.2 |
| Gasoline | | | |
| API | 57.1 | 56.4 | 56.3 |
| Aromatics: Vol % | 23.5 | 24.7 | 24.4 |
| Olefins: Vol % | 51.1 | 51.1 | 48.0 |
| Saturates: Vol % | 25.3 | 24.3 | 27.6 |
| Motor Octane Clear | 77.4 | 77.5 | 78.8 |
| Research Octane Clear | 91.4 | 92.4 | 92.4 |

What is claimed is:

1. A process for the conversion of unsegregated hydrocarbon feed in an FCC riser reactor employing zeolitic catalyst *to produce gasoline* which comprises:

(a) splitting the hydrocarbon feed and injecting at a plurality of positions along a length of said FCC riser reactor, wherein about 60 to 75 volume percent of said feed is injected to the lowest injection position, and the distance between said lowest injection position and the next highest injection position comprises at least 20% of the total length of said riser reactor;

(b) selecting the number of feed splits and selecting said positions along said length of said FCC riser reactor, to maximize the octane number of the gasoline;

(c) recycling regenerated catalyst into the bottom of said FCC riser reactor; and (d) lifting said regenerated catalyst up said FCC riser reactor said injection position of said hydrocarbon [oil] feed with a flow of catalytically inert gas.

2. A process for the conversion of unsegregated hydrocarbon feed in an FCC riser reactor employing zeolitic catalyst *to produce gasoline* which comprises:

(a) injecting said hydrocarbon feed at a plurality of positions along a length of said FCC riser reactor, wherein about 60 to 75 volume percent of said feed is injected to the lowest injection position, and the distance between said lowest injection position and the next highest injection position comprises at least 20% of the total length of said riser reactor;

(b) apportioning throughput through said position along said length of said FCC riser reactor to maximize octane number of the gasoline;

(c) recycling regenerated catalyst into the bottom of said FCC riser reactor; and (d) lifting said regenerated catalyst up said FCC riser reactor to said injection position of said hydrocarbon [oil] feed with a flow of catalytically inert gas.

3. The process of claim[s] 1 [and] *or* 2 wherein one of the upper injection points is located in the reactor or stripper vessel.

4. The process of claim[s] 1 [and] *or* 2 which further comprises: recycling unconverted slurry oil to one or more injection positions along the length of the riser.

5. The process of claim 4 wherein said slurry oil comprises material boiling above 650° F.

6. The process of claim[s] 1 [and] *or* 2 wherein said catalytically inert gas is steam.

7. The process of claim[s] 1 [and] *or* 2 wherein said catalytically inert gas is recycled absorber gas.

8. The process of claim[s] 1 [and] *or* 2 wherein said catalytically inert gas is gas selected from the group consisting of hydrogen, hydrogen sulfide, ammonia, methane, ethane, propane, and combinations thereof.

*9. A process for conversation of a full boiling range unsegregated hydrocarbon feed in an FCC riser reactor employing zeolitic catalyst to produce gasoline which comprises:*

*a) injecting said hydrocarbon feed at a plurality of positions along the length of said FCC riser reactor, wherein about 60 to 75 volume percent of said feed is injected to the lowest injection position, and the distance between said lowest injection position and the next highest injection position comprises at least 20% of the total length of said riser reactor;*

*b) apportioning throughput through said position along said length of said FCC riser reactor to maximize octane number of the gasoline;*

*c) recycling generated catalyst into the bottom of said FCC riser reactor; and*

*d) lifting said regenerated catalyst up said FCC riser reactor to said injection position of said hydrocarbon feed with a flow of catalytically inert gas.*

*10. The process of claim 9 wherein one of the upper injection points is located in the reactor or stripper vessel.*

*11. The process of claim 9 which further comprises recycling unconverted slurry oil to one or more injection positions along the length of the riser.*

*12. The process of claim 11 wherein said slurry oil comprises material boiling above 650° F.*

*13. The process of claim 9 wherein said catalytically inert gas is steam.*

*14. The process of claim 9 wherein said catalytically inert gas is recycled absorber gas.*

*15. The process of claim 9 wherein said catalytically inert gas is selected from the group consisting of hydrogen, hydrogen sulfide, ammonia, methane, ethane, propane or combinations thereof.*

*16. The process of claim 9 wherein all of said feed is apportioned between said lowest injection position and one higher injection position.*

*17. A process for the conversion of a full boiling range unsegregated hydrocarbon feed in a vertically elongated FCC riser reactor employing zeolitic catalyst to produce gasoline comprising:*

*a) injecting a first portion of said feed to a first injection position at the bottom of said riser reactor wherein about 60 to 75 volume percent of said feed is injected to the first injection position;*

*b) injecting the remaining portion of said feed at a second injection position in said riser reactor, said second injection position at a higher elevation in said riser reactor than said first injection position and wherein the distance between said first injection position and said second injection position is at least 20% of the said FCC riser reactor;*

*c) apportioning throughput throughout said first and second injection positions along said riser reactor to increase the octane number of gasoline product over that obtainable when said entire feed is injected at said first feed position under the same reactor conditions;*

*d) recycling regenerated catalyst to the bottom of said FCC riser reactor; and*

*e) lifting said regenerated catalyst up said FCC riser reactor to said first injection position of said hydrocarbon feed with a flow of catalytically inert gas.*

*18. The process of claim 17 wherein said catalytically inert gas is steam.*

*19. The process of claim 17 wherein said gas is selected from the group consisting of hydrogen, hydrogen sulfide, ammonia, methane, ethane, propane, and combinations thereof.*

*20. The process of claim 1 wherein said zeolitic catalyst comprises a zeolite selected from the group consisting of rare earth exchanged X, rare earth exchanged Y, hydrogen Y, ultrastable Y, superstable Y and ZSM-5.*

*21. The process of claim 20 wherein said zeolite is selected from the group consisting of rare earth exchanged Y and ZSM-5.*

*22. The process of claim 2 wherein said zeolitic catalyst comprises a zeolite selected from the group consisting of rare earth exchanged X, rare earth exchanged Y, hydrogen Y, ultrastable Y, superstable Y and ZSM-5.*

*23. The process of claim 22 wherein said zeolite is selected from the group consisting of rare earth exchanged Y and ZSM-5.*

*24. The process of claim 9 wherein said zeolitic catalyst comprises a zeolite selected from the group consisting of rare earth exchanged X, rare earth exchanged Y, hydrogen Y, ultrastable Y, superstable Y and ZSM-5.*

*25. The process of claim 24 wherein said zeolitic catalyst comprises a zeolite selected from the group consisting of rare earth exchanged Y and ZSM-5.*

*26. The process of claim 17 wherein said zeolitic catalyst comprises a zeolite selected from the group consisting of rare earth exchanged X, rare earth exchanged Y, hydrogen Y, ultrastable Y, superstable Y and ZSM-5.*

*27. The process of claim 26 wherein said zeolite is selected from the group consisting of rare earth exchanged Y and ZSM-5.*

* * * * *